(12) United States Patent
Kodama

(10) Patent No.: US 6,378,729 B1
(45) Date of Patent: Apr. 30, 2002

(54) AMPULE STORAGE CONTAINER FOR DISPENSING AMPULES AT A CONSTANT RATE

(75) Inventor: Tsuyoshi Kodama, Osaka (JP)

(73) Assignee: Kabushiki Kaisha Yuyama Seisakusho, Toyonaka (JP)

( * ) Notice: Subject to any disclaimer, the term of this patent is extended or adjusted under 35 U.S.C. 154(b) by 0 days.

(21) Appl. No.: 09/985,424

(22) Filed: Nov. 2, 2001

Related U.S. Application Data

(63) Continuation of application No. 09/517,287, filed on Mar. 2, 2000.

(30) Foreign Application Priority Data

Mar. 4, 1999 (JP) .............................................. 11-57027

(51) Int. Cl.[7] .................................................. B65H 3/00
(52) U.S. Cl. ...................................... 221/196; 414/416
(58) Field of Search ................................ 221/196, 194, 221/266, 263, 226, 232, 251; 414/416

(56) References Cited

U.S. PATENT DOCUMENTS

| | | |
|---|---|---|
| 3,393,831 A | 7/1968 | Stewart |
| 4,852,767 A | 8/1989 | Humphrey |
| 5,133,458 A | 7/1992 | Miller |
| 5,765,719 A | 6/1998 | Upham et al. |
| 5,800,113 A | 9/1998 | Yuyama et al. |
| 5,862,942 A | 1/1999 | Yuyama et al. |
| 5,961,021 A | 10/1999 | Koike et al. |

FOREIGN PATENT DOCUMENTS

JP 4-253613 9/1992

Primary Examiner—Kenneth W. Noland
(74) Attorney, Agent, or Firm—Wenderoth, Lind & Ponack, L.L.P.

(57) ABSTRACT

A constant-rate ampule feed device which can smoothly and reliably feed packaged ampules one by one at a constant rate. In a container body, a storage space is formed that is capable of storing packaged ampules in a single row with their central trunk portions arranged in parallel to each other. On the inner surface of the storage space, protrusions elongated toward a dispensing port at the bottom end are provided. The trunk portions of the packaged ampules are guided by the protrusions so as to prevent clogging of the packaged ampules. A rotor is provided at the dispensing port. In the outer surface of the rotor, a groove for receiving part of a packaged ampule is formed. A step is formed on the inner surface of the groove. The step contacts the trunk portions of packaged ampules to prevent clogging of packaged ampules at the dispensing port when packaged ampules are dispensed.

8 Claims, 6 Drawing Sheets

AMPULE STORAGE CONTAINER FOR DISPENSING AMPULES AT A CONSTANT RATE

This is a continuation application of Ser. No. 09/517,287, which was filed on Mar. 2, 2000.

BACKGROUND OF THE INVENTION

This invention relates to an ampule storage container of a constant-rate dispensing type for storing ampules, and a constant-rate ampule feed device.

Since ampules used in the medical field have light permeability, if they are filled with a liquid high in light decomposability, the liquid will degrade and their pharmaceutical effects will be lost.

In order to avoid such inconvenience, such ampules are, as described in unexamined Japanese patent publication 4-253613, packaged in a light-shielding packaging material to prevent permeation of light.

FIG. 8 shows an ampule packaged in a light-shielding packaging material. A packaging material 2 having light shieldability is wound around the ampule 1, and flat portions 3 are formed by pressing both ends of the packaging material 2.

Since the ampule A is packaged by winding the packaging material 2, it has a cylindrical trunk portion 4 at the central portion between both ends.

Generally, there are various kinds of ampules containing different liquids. If the work of taking out designated ones from among various ampules, and sending them to nurse stations or treating rooms is performed manually by pharmacists, workability would be not satisfactory.

In order to solve such problems, for a storage/feed device described in unexamined Japanese patent publication 5-229660, ampules are stored in an ampule storage container in a row, and are dispensed one by one through the bottom of the container.

If ampules A packaged as shown in FIG. 8 are taken out mechanically by the storage/feed device described in the above publication, since the packaged ampules A have flat portions 3 at both ends, clogging of packaged ampules will occur in the ampule storage container, making it impossible to reliably dispense them one by one.

An object of this invention is to provide an ampule storage container for constant-rate dispensing, and a constant-rate ampule feed device which can reliably dispense such packaged ampules as shown in FIG. 8 one by one.

SUMMARY OF THE INVENTION

According to the present invention, there is provided an ampule storage container for dispensing packaged ampules at a constant rate, the container having a storage space which can store the packaged ampules which are packaged in a packaging material, both ends of the packaging material being pressed flat, with central trunk portions of the packaged ampules arranged substantially parallel to each other. A dispensing port for dispensing the packaged ampules is provided at one end of the storage space. Also, the ampules in the storage space are supported by the trunk portions of the packaged ampules with both flat ends thereof kept in a non-contact manner.

By supporting the trunk portions of the ampules only with the flat end portions kept in a non-contact state, the packaged ampules can be fed smoothly.

The ampules may be supported in the storage space either by protrusions formed on the inner surface of the storage space or on an endless conveyor for transporting the ampules toward the dispensing port.

The ampule storage container formed with the protrusions may be used either in a vertical position or in an inclined position.

The ampule container comprising a belt conveyor for supporting the trunk portions of the packaged ampules is used in a substantially horizontal position where the conveyor is located in a lower position.

According to this invention, there is also provided a constant-rate ampule feed device comprising the ampule storage container as described above and a dispensing means provided at the dispensing port of the ampule storage container for dispensing the packaged ampules one at a time.

By the provision of a dispensing means at the dispensing port, the packaged ampules fed toward the dispensing port can be dispensed one by one at a constant rate.

According to this invention, the dispensing means comprises a cylindrical rotor rotatable in one direction and a motor for driving the rotor. The rotor is formed with a groove adapted to receive part of the packaged ampule, and a step for keeping the flat ends of the packaged ampules out of contact with the inner surface of the groove while contacting the trunk portion of the packaged ampules.

Other features and objects of the present invention will become apparent from the following description made with reference to the accompanying drawings, in which:

DETAILED DESCRIPTION OF THE PREFERRED EMBODIMENT

Hereinbelow, an embodiment of this invention will be described with reference to FIGS. 1 through 7.

Figure 1:
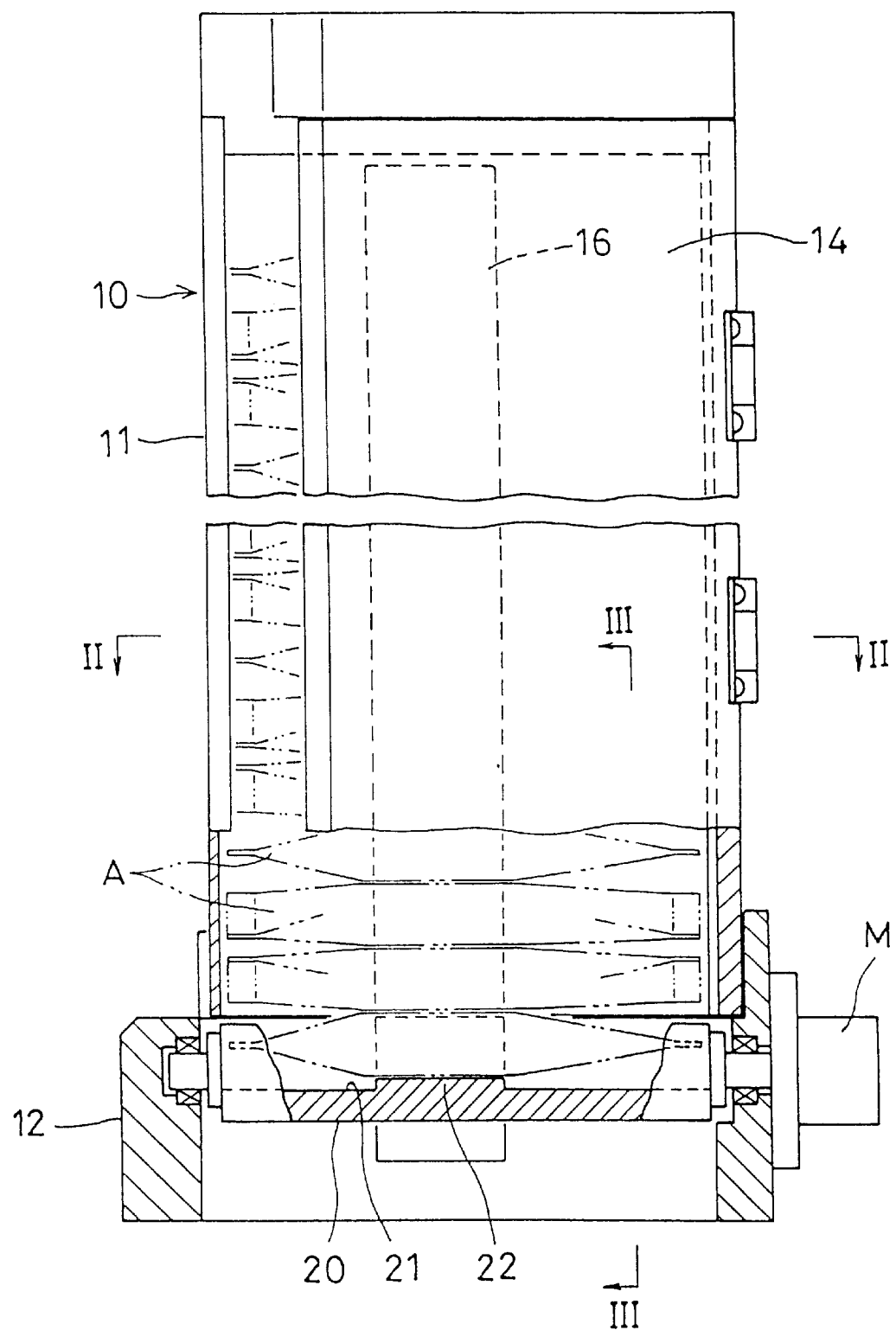
FIG. 1 is a vertical sectional front view of a constant-rate ampule feed device according to this invention.
Figure 2:
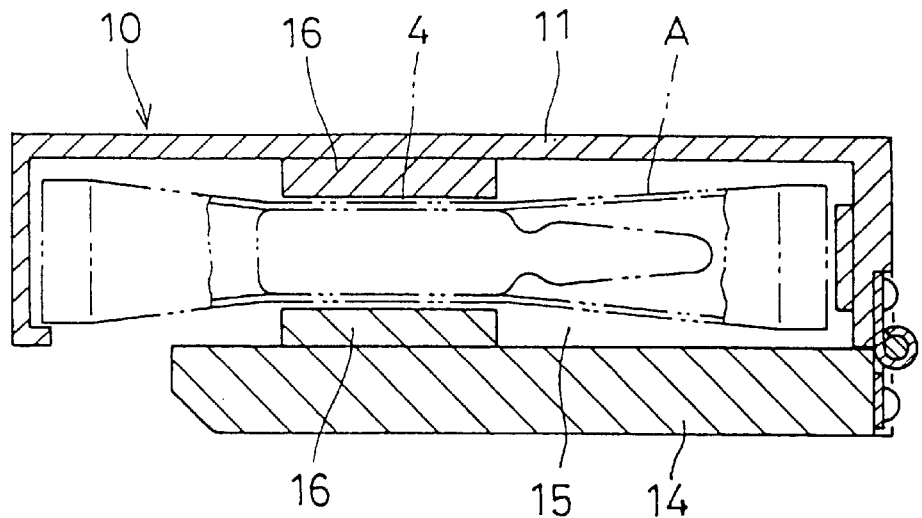
FIG. 2 is a sectional view taken along line II—II of FIG. 1.
Figure 3:
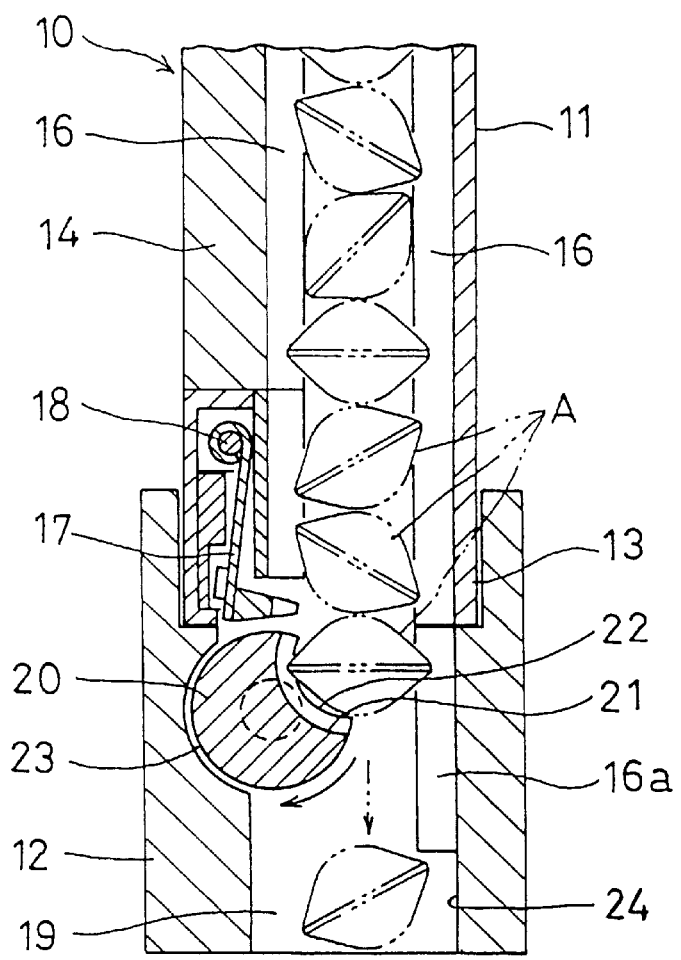
FIG. 3 is a sectional view taken along line III—III of FIG. 1.

As shown in FIGS. 1 to 3, the ampule storage container 10 comprises a cylindrical container body 11, and a base 12 supporting the bottom end of the container body 11. A groove 13 (FIG. 3) is formed in the top surface of the base 12. It is open at the outer peripheral end of the base 12, and the bottom end portion of the body 11 is detachably mountable in the groove 13.

The container body 11 has an openable lid 14. By closing the lid, a vertically extending, rectangular storage space 15 is formed.

Figure 8:
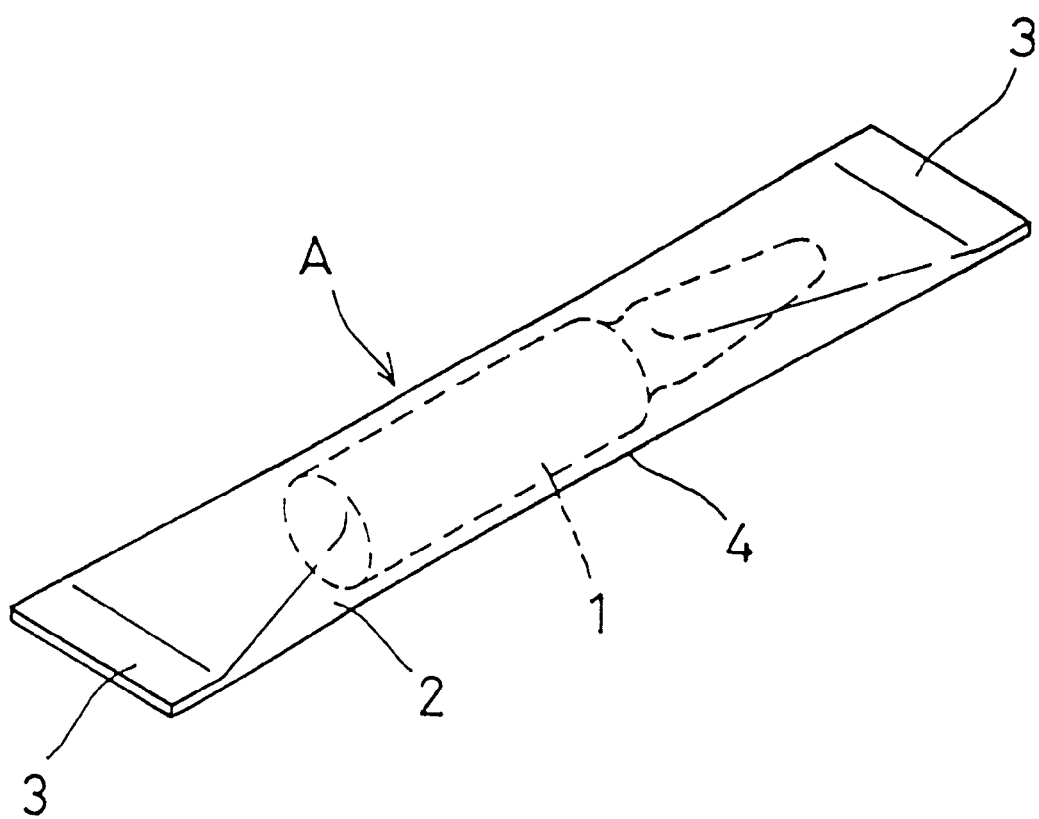
FIG. 8 is a perspective view showing a packaged ampule.

In the storage space 15, packaged ampules A shown in FIG. 8 can be stored in a single row with the cylindrical trunk portions 4 arranged in parallel. On the opposed inner surfaces of the storage space 15, vertically elongated protrusions 16 are formed at positions opposite the trunk portions 4 of the ampules (FIG. 2).

The protrusions 16 have a smaller width than the length of the trunk portions 4. With the trunk portions 4 of the packaged ampules A in contact with the protrusions 16, the flat portions 3 at both ends of the packaged ampules A are held in a non-contact state with the opposed inner surfaces of the storage space 15.

The storage space 15 is open at the bottom end, and a stopper 17 is provided on one side of the opening (FIG. 3). The stopper 17 is L-shaped, and its tip is pivoted about a pin 1 8, its bottom end being biased toward the opening of the storage space 15 at its bottom by a spring (not shown).

When the container body 11 is dismounted from the base 12, the bottom end of the stopper 17 protrudes into the bottom end opening of the storage space, preventing packaged ampules A stored in the storage container 15 from being discharged. When the container body 11 is set on the base 12, the bottom end of the stopper 17 is retracted from the bottom end opening of the storage space 15 by an unillustrated retractor.

The base 12 is provided with a dispensing port 19 communicating with the bottom end opening of the storage space 15 in the container body 11. At one side of the dispensing port 15, a cylindrical rotor 20 is provided. On the outer circumferential surface of the rotor 20, a groove 21 to receive part of a packaged ampule A is formed. On the inner surface of the groove 21, a step 22 adapted to contact the trunk portions 4 of each packaged ampule A is provided. With the trunk portion 4 supported on the step 22, the flat portions 3 at both ends of the packaged ampule A are kept out of contact with the inner surface of the groove 21.

The mounting position of the rotor 20 is determined such that with its outer cylindrical surface 23 opposite a protrusion 16a provided on an inner surface 24 of the dispensing port 19 opposite the rotor, a narrow gap for preventing the packaged ampules A from dropping is formed between the cylindrical surface 23 and the protrusion 16a. The protrusion 16a is provided so as to continue from one of the protrusions 16 in the storage space 15.

Now, with packaged ampules A stored in a single row in the container body 11, when the rotor 20 rotates in the direction shown by the arrow of FIG. 3 by a motor M connected to its end, the lowermost packaged ampule A moves into the groove 21 of the rotor 20. By the rotation of the rotor 20, the packaged ampule A in the groove 21 is discharged through the discharge port 19, while the next packaged ampule A is received by the cylindrical surface 23 on the outer surface of the rotor 20 and prevented from dropping.

Thus, the packaged ampules A stored in the container body 11 is dispensed one by one as the rotor 20 rotates.

When the packaged ampules A are dispensed, with the trunk portions 4 of the packaged ampules A in contact with the protrusions 16 provided on the opposed surfaces of the storage space 15, the flat portions 3 at both ends of the packaged ampules A are kept out of contact with the opposed surfaces of the storage space 15, the packaged ampules A can move smoothly in the storage space 15 toward the dispensing port 19 without clogging.

Also, since the step 22 for supporting the trunk portion 4 of the packaged ampules A is provided on the inner surface of the groove 21 formed in the rotor 20, when part of a packaged ampule A enters the groove, the trunk portion 4 of the packaged ampule A is supported by the step 22. In this state, the flat portions 3 at both ends of the packaged ampule A are kept out of contact with the inner surface of the groove 21.

Thus, a packaged ampule that has entered the groove 21 is always in a stable state and there will be no trouble of packaged ampules A getting caught between the rotor 20 and the protrusion 16a in the discharge port 19. Packaged ampules A can thus be reliably and smoothly dispensed one by one.

When the number of packaged ampules A in the container body 11 becomes small, or the container body becomes empty as a result of the dispensing of packaged ampules A, the container body 11 is dismounted from the base 12 and the lid 14 is opened to supply packaged ampules A into the container body.

Figure 4:
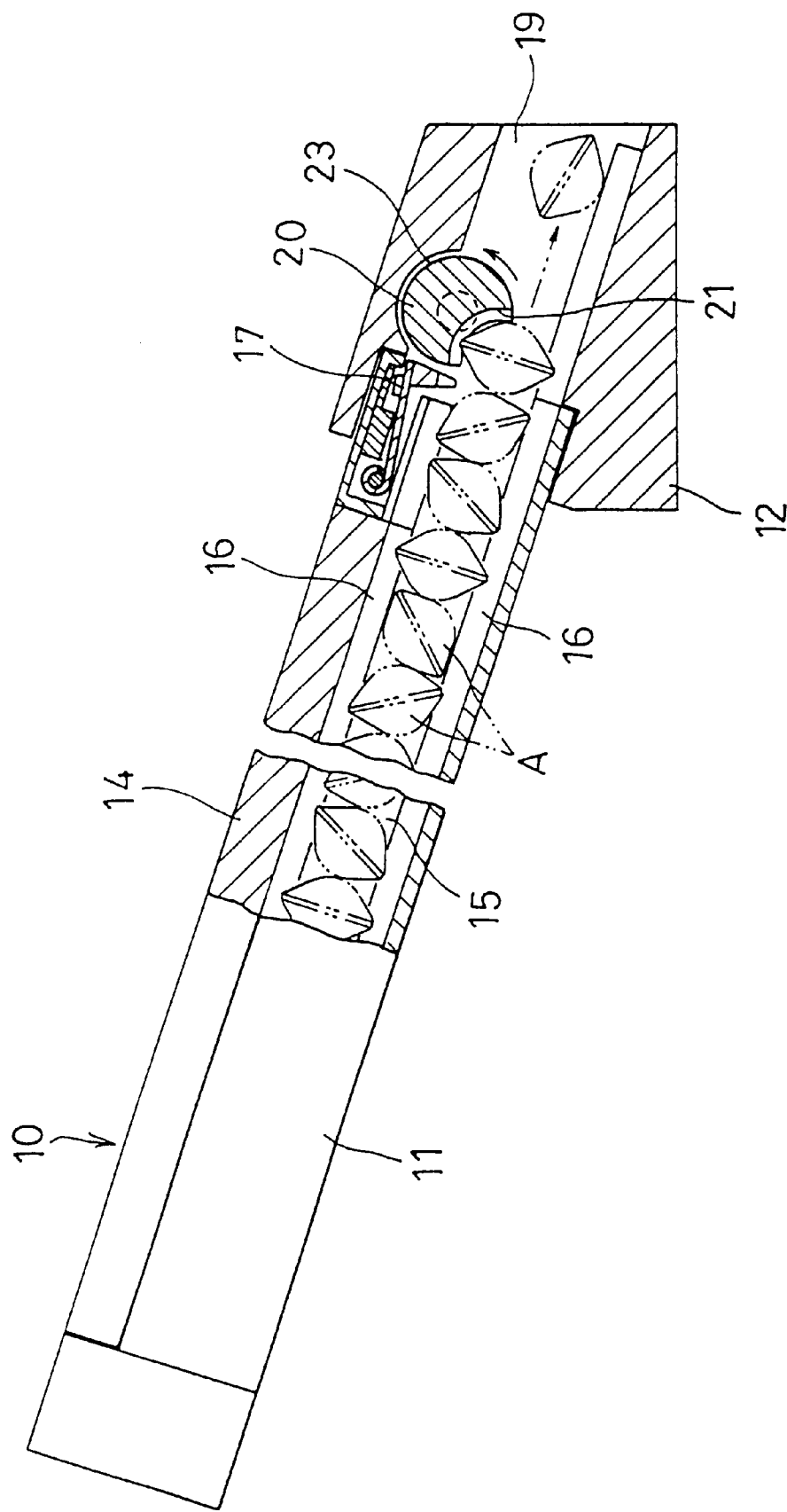
FIG. 4 is a partially cutaway side view showing the device shown in FIG. 1 in a different state of use.

In the embodiment shown in FIGS. 1 to 3, the ampule storage container A is used in a vertical state. But as shown in FIG. 4, it may be used in an inclined state with the dispensing port located at the bottom end.

Figure 5:
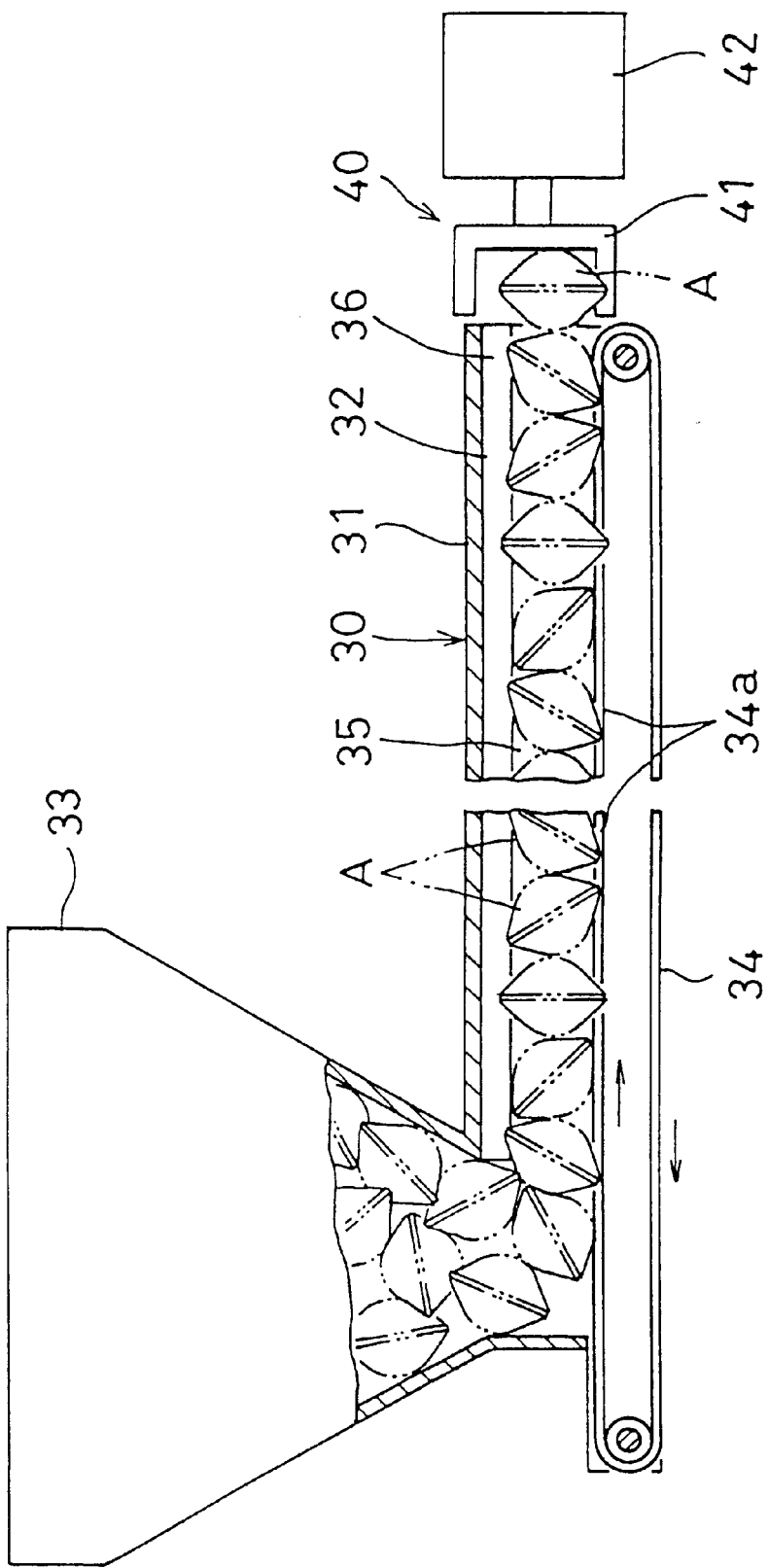
FIG. 5 is a vertical sectional front view showing another embodiment of an ampule constant-rate feed device according to this invention.
Figure 6:
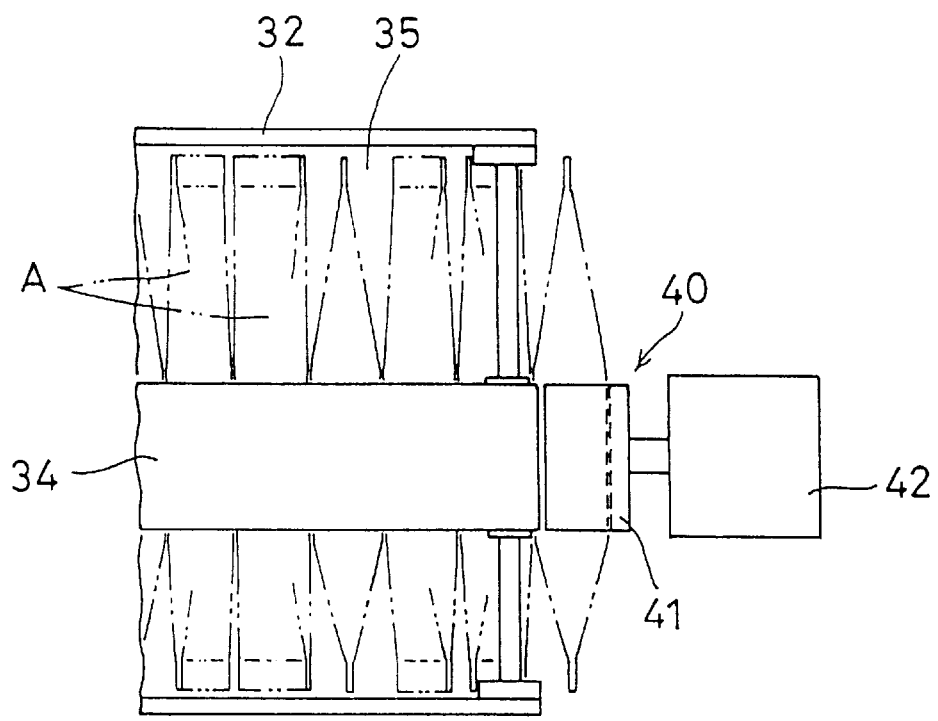
FIG. 6 is a bottom plan view of the device shown in FIG. 5.

FIGS. 5 and 6 show another embodiment of a constant-rate ampule feed device according to this invention. In this embodiment, a hopper 33 for storing packaged ampules A is connected to one end of a guide frame 30 having a top plate 31 and a pair of side plates 32. Under the guide frame 30, a conveyor belt 34 having a supply end disposed under the outlet of the hopper 33 is provided. Between a carrier belt 34a on the upper side of the conveyor 34 and the guide frame 30, a storage space in which packaged ampules A can be stored in a single row with their trunk portions 4 arranged in parallel to each other is provided.

Also, at one end of the storage space 35, a dispensing port 36 is formed where a dispensing device 40 for dispensing packaged ampules A one by one is provided.

The conveyor belt 34 is adapted to support the trunk portions 4 of the packaged ampules A and carry them toward the dispensing port 36. In this state, the flat portions 3 at both ends are kept in a non-contact state with the conveyor belt 34.

The dispensing device 40 comprises a discharge frame 41 which has a section having a tumbled-U shape and has one side thereof open opposite the dispensing port 36. The discharge frame 41 is turned by a motor 42.

With the ampule feed device having such a structure, as the conveyor belt 34 moves in the direction of arrow, the packaged ampules A are moved toward the dispensing port 36. When the ampule at frontmost is fed into the discharge frame 41, the latter is rotated to let the ampule A fall.

When packaged ampules A are dispensed in the above manner, since the ampules A in the storage space 35 have their trunk portions 4 supported by the conveyor belt 34, the height of the ampules A is stable, and the flat portions 3 at both ends of the ampules A are kept in a non-contact state. Thus it is possible to feed packaged ampules A smoothly in a single row toward the dispensing port 36 and thus to reliably dispense them one by one.

When packaged ampules have been dispensed, they are supplied into the storage space 35 from the hopper 33.

Figure 7:
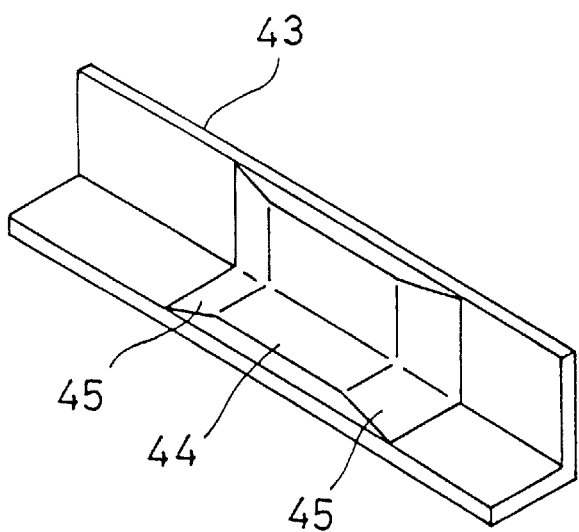
FIG. 7 is a perspective view showing another example of the dispensing device.

In the embodiment shown in FIGS. 5 and 6, as the discharge frame 41, one having the tumbled-U shape is used. But as shown in FIG. 7, an L-shaped discharge frame 43 may be used. In this case, if it has the same length as packaged ampules A, a step 44 for supporting the trunk portions 4 of packaged ampules is preferably formed on the central portion of the discharge frame 43, and inclined surfaces 45 are provided at both ends of the step 44 so that packaged ampules A can be smoothly dropped and discharged.

As described above, according to this invention, stick-shaped packaging ampules are supported at the cylindrical trunk portions at the center of the packaged ampules in the storage space which can store packaged ampules with the trunk portions arranged substantially parallel to each other, with the flat ends thereof supported in a non-contact manner, so that it is possible to smoothly feed packaged ampules toward the dispensing port while keeping them arranged in order and to reliably dispense packaged ampules one by one with the dispensing means provided at the dispensing port at a constant rate.

Also, by forming the groove in the outer surface of the rotor for dispensing packaged ampules at a constant rate, and by providing a step on the inner surface of the groove, the trunk portion of a packaged ampule that has entered the groove is supported by the step, so that the ampules are supported in a stable state. Thus, it is possible to reliably discharge packaged ampules one by one as the rotor rotates.

What is claimed is:

1. A constant-rate ampule feed device comprising:
    an ampule storage container for dispensing packaged ampules at a constant rate, said ampule storage container comprising a storage space which can store the packaged ampules that are packaged in a packaging material such that both ends of the packaging material are pressed flat, with central trunk portions of the packaged ampules arranged substantially parallel to each other, wherein a dispensing port for dispensing the packaged ampules is provided at one end of said storage space, and wherein the packaged ampules in said storage space are supported by the trunk portions of the packaged ampules with both flat ends thereof being maintained in a non-contact manner with respect to said storage space; and
    a dispensing means provided at said dispensing port of said ampule storage container for dispensing the packaged ampules one at a time,
    said dispensing means comprising a cylindrical rotor rotatable in one direction and a motor for driving said rotor, wherein said rotor is formed with a groove adapted to receive part of the packaged ampule, and a step for keeping the flat ends of the packaged ampules out of contact with the inner surface of the groove while contacting the trunk portion of the packaged ampules.

2. A constant-rate ampule feeding device for feeding packaged ampules each having flattened ends and a central trunk portion, said ampule feeding device comprising:
    a container body;
    a lid connected to said container body so as to be movable between an open position and a closed position, wherein said container body and said lid define a storage space for storing a plurality of the packaged ampules so that the central trunk portions are arranged in parallel to one another;
    a first elongated protrusion provided on an interior wall surface of said container body;
    a second elongated protrusion provided on an interior wall surface of said lid, wherein said first and second elongated protrusions are positioned so as to be on opposite sides of the packaged ampules and to oppose the trunk portions of the packaged ampules so that the flattened ends of the packaged ampules are held in a non-contact state with respect to inner peripheral surfaces of said lid and said container body;
    a base supporting an end of said container body, said base having a dispensing port communicating with an open end of the storage space; and
    a packaged ampule dispensing device, provided in said base, for dispensing the packaged ampules one by one through the dispensing port.

3. The constant-rate ampule feeding device as claimed in claim 2, wherein said packaged ampule dispensing device comprises a cylindrical rotor having a groove formed in an outer circumferential surface thereof, and a stepped portion provided on an inner surface of the groove, wherein the stepped portion is adapted to contact the central trunk portion of the packaged ampules to prevent the flattened portions from contacting the inner surface of the groove.

4. The constant-rate ampule feeding device as claimed in claim 2, wherein each of said protrusions has a width that is formed so as to be slightly smaller than the length of the trunk portions of the packaged ampules.

5. The constant-rate ampule feeding device as claimed in claim 2, wherein a bottom end portion of said container body is detachably mounted in said base.

6. A constant-rate ampule feeding device for feeding packaged ampules each having flattened ends and a central trunk portion, said ampule feeding device comprising:
    an ampule storage container having a pair of opposed, elongated interior wall surface elongated in one direction and defining a storage space for storing a plurality of the packaged ampules so that the central trunk portions are arranged in parallel to one another, and
    a first elongated protrusion provided on one of said pair of interior wall surfaces to extend in said one direction, wherein said first protrusion is positioned so as to oppose and contact only the trunk portions of the packaged ampules with the packaged ampules arranged perpendicular to said one direction so that the flattened ends of the packaged ampules are held in a non-contact state with respect to said interior wall surfaces of said ampule storage container;
    said ampule storage space having an open end at a longitudinal end thereof for dispensing the packaged ampules.

7. The constant-rate ampule feeding device of claim 6, further comprising a second elongated protrusion provided on the other of said pair of interior wall surfaces to extend in said one direction, wherein said second protrusion is positioned opposite to said first protrusion with the packaged ampules therebetween so as to oppose the trunk portions of the packaged ampules with the packaged ampules arranged perpendicular to said one direction.

8. A constant-rate ampule feeding device for feeding packaged ampules each having flattened ends and a central trunk portion, said ampule feeding device comprising:
    an ampule storage contained having an elongated top interior wall surface elongated in one direction;
    a conveyor belt provided under the elongated top wall so as to extend in the one direction,
    said elongated top interior wall surface and said belt conveyor defining a storage space for storing a plurality of the packaged ampules such that the central trunk portions are arranged in parallel to one another,
    wherein said conveyor belt is sized and positioned so as to oppose and support only the trunk portions of the packaged ampules so that the flattened ends of the packaged ampules are held in a non-contact state with respect to said interior wall surfaces of said ampule storage container; and
    an elongated protrusion provided on said elongated top interior wall surface so as to extend in the one direction, wherein said protrusion is positioned opposite to said conveyor belt with the packaged ampules therebetween so as to oppose the trunk portions of the packaged ampules with the packaged ampules arranged perpendicular to the one direction,
    said ampule storage space having an open end at a longitudinal end thereof for dispensing the packaged ampules.

* * * * *